(12) United States Patent
Ishii et al.

(10) Patent No.: US 11,389,875 B2
(45) Date of Patent: Jul. 19, 2022

(54) PROCESS FOR PRODUCING NICKEL POWDER

(71) Applicant: SUMITOMO METAL MINING CO., LTD., Tokyo (JP)

(72) Inventors: Junji Ishii, Ehime (JP); Hiroyuki Tanaka, Ehime (JP); Masaya Yukinobu, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 296 days.

(21) Appl. No.: 16/465,273

(22) PCT Filed: Dec. 5, 2017

(86) PCT No.: PCT/JP2017/043706
§ 371 (c)(1),
(2) Date: May 30, 2019

(87) PCT Pub. No.: WO2018/105628
PCT Pub. Date: Jun. 14, 2018

(65) Prior Publication Data
US 2019/0388974 A1    Dec. 26, 2019

(30) Foreign Application Priority Data

Dec. 5, 2016   (JP) .............................. JP2016-235664
Jan. 18, 2017  (JP) .............................. JP2017-006362
Mar. 23, 2017  (JP) .............................. JP2017-056799

(51) Int. Cl.
*B22F 9/24*   (2006.01)
*B22F 1/02*   (2006.01)
*B22F 1/16*   (2022.01)

(52) U.S. Cl.
CPC ................... *B22F 9/24* (2013.01); *B22F 1/16* (2022.01); *B22F 2302/45* (2013.01); *B22F 2304/10* (2013.01); *B22F 2998/10* (2013.01)

(58) Field of Classification Search
CPC .... B22F 1/02; B22F 2302/45; B22F 2304/10; B22F 2998/10; B22F 9/24
See application file for complete search history.

(56) References Cited

U.S. PATENT DOCUMENTS

2017/0008089 A1    1/2017 Yoneyama et al.

FOREIGN PATENT DOCUMENTS

JP       S49-70862 A      7/1974
JP       H04-365806 A    12/1992
(Continued)

OTHER PUBLICATIONS

JP-06049557-A, Honda Jitoku; Kenmochi Yoji, English translation obtained from EPO, 1994 (Year: 1994).*
(Continued)

*Primary Examiner* — Anthony J Zimmer
*Assistant Examiner* — Jacob J Gusewelle
(74) *Attorney, Agent, or Firm* — Oliff PLC (57) ABSTRACT

The purpose of the present invention is to provide a process for producing nickel powder capable of obtaining fine nickel powder in wet process, and also, capable of decreasing content of impurities by medicament (additive) used in crystallization of nickel powder which is reduction reaction. 1. A process for producing nickel powder, comprising a crystallization step for obtaining nickel crystal powder by reduction reaction in reaction solution in which at least water-soluble nickel salt, reducing agent, alkali hydroxide, if necessary metal salt of metal more noble than nickel, and water are mixed, and which is blended with sulfur-containing compound in advance, wherein the reducing agent is (Continued)

hydrazine (N2H4), the sulfur-containing compound is a compound having any of sulfur-containing functional group structure represented by —SH, sulfur-containing functional group structure represented by —S—S—, sulfur-containing functional group structure represented by —O—S(=S)(=O)—O— at least in molecule, and a ratio (A) of substance quantity of the sulfur-containing compound and nickel in the reaction solution ((molar number of the sulfur-containing compound/molar number of nickel)*$10^6$) [molar ppm], an effective multiplication factor (B) of the sulfur-containing functional group of the sulfur-containing compound [magnification] (—SH: 1, —S—S—: 2, —O—S(=S)(=O)—O—: 1), and a ratio (C) of substance quantity of the metal salt of metal more noble than nickel and nickel ((molar number of metal salt of metal more noble than nickel/molar number of nickel)*$10^6$) [molar ppm] is in a range of $0.1 \leq A*B \leq 0.75C+30$ ($0 \leq C \leq 100$).

13 Claims, 4 Drawing Sheets

(56) References Cited

FOREIGN PATENT DOCUMENTS

| JP | 06049557 A | * | 2/1994 | |
| JP | 2002-530521 A | | 9/2002 | |
| JP | 2004-332055 A | | 11/2004 | |
| JP | 2008-127680 A | | 6/2008 | |
| JP | 2015-151590 A | | 8/2015 | |
| JP | 6172413 B1 | * | 8/2017 | B22F 9/24 |
| WO | 2017/159659 A1 | | 9/2017 | |

OTHER PUBLICATIONS

Feb. 13, 2018 International Search Report issued in International Patent Application No. PCT/JP2017/043706.

* cited by examiner

PROCESS FOR PRODUCING NICKEL POWDER

BACKGROUND OF THE INVENTION

Field of the Invention

The present invention relates to a process for producing low-cost, high-performance nickel powder used as an electrode material of a laminated ceramic component, and especially relates to a process for producing low-cost, high-performance nickel powder obtained by wet process. The present application claims priority based on Japanese Patent Application No. 2016-235664 filed in Japan on Dec. 5, 2016, Japanese Patent Application No. 2017-006362 filed in Japan on Jan. 18, 2017, and Japanese Patent Application No. 2017-056799 filed in Japan on Mar. 23, 2017, which are incorporated by reference herein.

Description of Related Art

Nickel powder is used as a material of a capacitor of an electronic circuit, especially as a material of a thick film conductor composing an internal electrode of a laminated ceramic component such as a laminated ceramic capacitor (MLCC: multilayer ceramic capacitor) or a multilayer ceramic substrate.

Recently, enlargement of capacity of the laminated ceramic capacitor has been progressed, and an amount of internal electrode paste used for forming the internal electrode of the laminated ceramic capacitor is increasing significantly. Therefore, as metal powder for internal electrode paste composing the thick film conductor, low-cost base metal such as nickel is mainly used instead of using high-cost noble metal.

Along with enlargement of capacity and miniaturization of the laminated ceramic capacitor, thinning of the internal electrode and a dielectric substance is progressing. Along with this, micronization of particle size of nickel powder used in internal electrode paste is also progressing, and nickel powder with average particle size equal to or less than 0.5 micrometer is required, and especially, use of nickel powder with average particle size equal to or less than 0.3 micrometer has become mainstream.

When roughly classified, there are vapor phase process and wet process in a process for producing nickel powder. For example, vapor phase process is proposed in Patent Documents 1 and 2, and for example, wet process is proposed in Patent Documents 3 to 5.

Patent Document 1: Japanese Patent Application Laid-Open No. H4-365806
Patent Document 2: Japanese Patent Application Publication No. 2002-530521
Patent Document 3: Japanese Patent Application Laid-Open No. 2004-332055
Patent Document 4: Japanese Patent Application Laid-Open No. 2008-127680
Patent Document 5: Japanese Patent Application Laid-Open No. S49-070862

SUMMARY OF THE INVENTION

However, there is a problem in vapor phase process that particle size distribution of obtained nickel powder will be wide. In addition, expensive classification device is necessary for classification treatment of nickel powder, and there is a problem that increase in cost of a product is inevitable as a recovery of the product will be decreased significantly. Also, there is a problem that classification treatment cannot cope with further thinning of the internal electrode in the future.

On the other hand, there is an advantage in wet process that particle size distribution of obtained nickel powder will be narrow compared to vapor phase process. However, there is a problem in wet process of Patent Document 3 that a range of condition of reduction reaction suitable for obtaining nickel powder with average particle size less than 0.1 micrometer will be narrow. In addition, in wet process of Patent Document 4, fine metal colloid particles are obtained by reacting metal compound such as nickel and reducing agent such as hydrazine in liquid phase in presence of additive such as mercapto carboxylic acid. However, main purpose of mercapto carboxylic acid or the like is to achieve dispersion stability as protective agent of metal particles, so it is necessary to bond or adsorb large quantity of mercapto carboxylic acid or the like on surface of nickel powder, and there was a problem that large quantity of carbon or sulfur derived from mercapto carboxylic acid or the like are contained in nickel powder as impurities. In addition, similarly, also in wet process of Patent Document 5, there was a problem that large quantity of sulfur is contained in nickel powder as impurities, in the nickel powder obtained by involving sulfur component in solution at the time of reduction crystallization as large amount of sulfur compound is added.

Here, the purpose of the present invention is to provide a process for producing nickel powder capable of obtaining fine nickel powder, and also, capable of decreasing content of impurities such as chlorine, sodium and sulfur by medicament (additive) used in crystallization of nickel powder which is reduction reaction.

The inventors have found that fine nickel crystal powder (nickel powder) can be obtained by blending infinitesimal amount, and also, suitable amount of specific sulfur-containing compound in reaction solution in advance, i.e. before start of reduction reaction, in a crystallization step in a process for producing nickel powder by wet process, i.e. in a step for performing reduction reaction in reaction solution containing water-soluble nickel salt, hydrazine as reducing agent, alkali hydroxide as pH conditioner, if necessary metal salt of metal more noble than nickel, and water. The present invention has been completed based on such knowledge.

One embodiment of the present invention is a process for producing nickel powder, comprising a crystallization step for obtaining nickel crystal powder by reduction reaction in reaction solution in which at least water-soluble nickel salt, reducing agent, alkali hydroxide, if necessary metal salt of metal more noble than nickel, and water are mixed, and which is blended with sulfur-containing compound in advance, wherein the reducing agent is hydrazine ($N_2H_4$), the sulfur-containing compound is a compound having any of sulfur-containing functional group structure represented by —SH, sulfur-containing functional group structure represented by —S—S—, sulfur-containing functional group structure represented by —O—S(=S)(=O)—O— at least in molecule, and it satisfies following formula 1, when a ratio of substance quantity of the sulfur-containing compound and nickel in the reaction solution ((molar number of the sulfur-containing compound/molar number of nickel) *10$^6$) is A [molar ppm], when an effective multiplication factor of the sulfur-containing functional group of the sulfur-containing compound is B [magnification] (—SH: 1, —S—S—: 2, —O—S(=S)(=O)—O—: 1), and when a ratio of substance quantity of the metal salt of metal more noble than nickel and nickel ((molar number of metal salt of metal more noble than nickel/molar number of nickel)*10⁶) is C [molar ppm].

$$0.1 \leq A*B \leq 0.75C+30 (0 \leq C \leq 100) \quad \text{(Formula 1)}$$

In this way, it is possible to obtain fine nickel powder by effectively preventing significant extension of crystallization reaction time and significant decrease in particle growth rate of initial nucleus caused by excess presence of sulfur-containing compound. Further, content of impurities such as chlorine, sodium and sulfur contained in nickel powder is also decreased, so it is possible to inexpensively produce high performance nickel powder suitable for internal electrode which does not have bad influence when producing laminated ceramic capacitor.

In addition, in one embodiment of the present invention, the metal salt of metal more noble than nickel may be palladium salt.

In this way, it is possible to control particle size of obtained nickel powder to be finer.

In addition, in one embodiment of the present invention, the sulfur-containing compound may be one or more selected from thioglycolic acid ($HOOCCH_2SH$), thiomalic acid ($HOOCCH(SH)CH_2COOH$), and sodium hydrogen sulfide ($NaSH$).

These compounds are suitable for the compound having sulfur-containing functional group structure represented by —SH.

In addition, in one embodiment of the present invention, the sulfur-containing compound may be one or more selected from dithioglycolic acid ($HOOCCH_2SSCH_2COOH$) and dimethyl disulfide ($CH_3SSCH_3$).

These compounds are suitable for the compound having sulfur-containing functional group structure represented by —S—S—.

In addition, in one embodiment of the present invention, the sulfur-containing compound may be one or more selected from thiosulfuric acid ($H_2S_2O_3$), sodium thiosulfate ($Na_2S_2O_3$), and potassium thiosulfate ($K_2S_2O_3$).

These compounds are suitable for the compound having sulfur-containing functional group structure represented by —O—S(=S)(=O)—O—.

In addition, in one embodiment of the present invention, average particle size of nickel powder may be 0.02 micrometer to 0.2 micrometer.

In this way, it is possible to cope with recent thinning of internal electrode of laminated ceramic capacitor.

In addition, in one embodiment of the present invention, the water-soluble nickel salt may be one or more selected from nickel chloride ($NiCl_2$), nickel sulfate ($NiSO_4$), and nickel nitrate ($Ni(NO_3)_2$).

In this way, it is possible to obtain fine nickel crystal powder (nickel powder).

In addition, in one embodiment of the present invention, the alkali hydroxide may be one or more selected from sodium hydroxide (NaOH) and potassium hydroxide (KOH).

These alkali hydroxides are preferable as they are easily available.

In addition, in one embodiment of the present invention, it may contain amine compound in the reaction solution, and the amine compound may contain two or more of any of functional group selected from primary amino group (—$NH_2$) or secondary amino group (—NH—) in molecule, and a ratio of substance quantity of the amine compound and nickel in the reaction solution (molar number of the amine compound/molar number of nickel*100) may be in a range of 0.01 mol % to 5 mol %.

In this way, it is possible to exhibit effects of amine compound as autolysis inhibitor of hydrazine, accelerator of reduction reaction, and coupling inhibitor of nickel particles, so by synergistic effect with functions of sulfur-containing compound or metal salt of metal more noble than nickel, it is possible to stably crystallize fine nickel crystal powder (nickel powder).

In addition, in one embodiment of the present invention, the amine compound may be at least any of alkylene amine or alkylene amine derivative.

In this way, it is possible to dissolve amine compound in reaction solution in the crystallization step.

In addition, in one embodiment of the present invention, the alkylene amine may be one or more selected from ethylene diamine ($H_2NC_2H_4NH_2$), diethylene triamine ($H_2NC_2H_4NHC_2H_4NH_2$), triethylene tetramine ($H_2N(C_2H_4NH)_2C_2H_4NH_2$), tetraethylene pentamine ($H_2N(C_2H_4NH)_3C_2H_4NH_2$), pentaethylene hexamine ($H_2N(C_2H_4NH)_4C_2H_4NH_2$), and the alkylene amine derivative may be one or more selected from tris (2-aminoethyl) amine ($N(C_2H_4NH_2)_3$), (2-aminoethyl) aminoethanol ($H_2NC_2H_4NHC_2H_4OH$), ethylene diamine-N, N'-diacetate ($HOOCCH_2NHC_2H_4NHCH_2COOH$).

These alkylene amine and alkylene amine derivative are preferable as they are soluble in water.

In addition, in one embodiment of the present invention, in the crystallization step, reaction starting temperature of the reaction solution may be 40° C. to 90° C.

In this way, it is possible to produce high performance nickel crystal powder inexpensively while maintaining high productivity, and while inhibiting consumption of hydrazine.

The process for producing nickel powder of the present invention is able to obtain fine nickel powder, even it is a process for producing nickel powder by wet process using hydrazine as reducing agent. Further, by medicament used in crystallization of nickel powder, content of impurities such as chlorine, sodium and sulfur in nickel powder will be decreased, so it is possible to inexpensively produce high performance nickel powder suitable for internal electrode which does not have bad influence when producing laminated ceramic capacitor.

DETAILED DESCRIPTION OF THE INVENTION

Hereinafter, explaining a process for producing nickel powder relating to the present invention in following orders. In addition, the present invention should not be limited by the following examples, and the present invention can be modified optionally without departing from a gist of the present invention.
1. Process for producing nickel powder
   1-1. Crystallization step
      1-1-1. Medicaments used in the crystallization step
      1-1-2. Crystallization procedure
      1-1-3. Reduction reaction
      1-1-4. Reaction starting temperature
      1-1-5. Recovery of nickel crystal powder
   1-2. Disintegrating step (post-treatment step)
2. Nickel powder <1. Process for Producing Nickel Powder>

Figure 1:
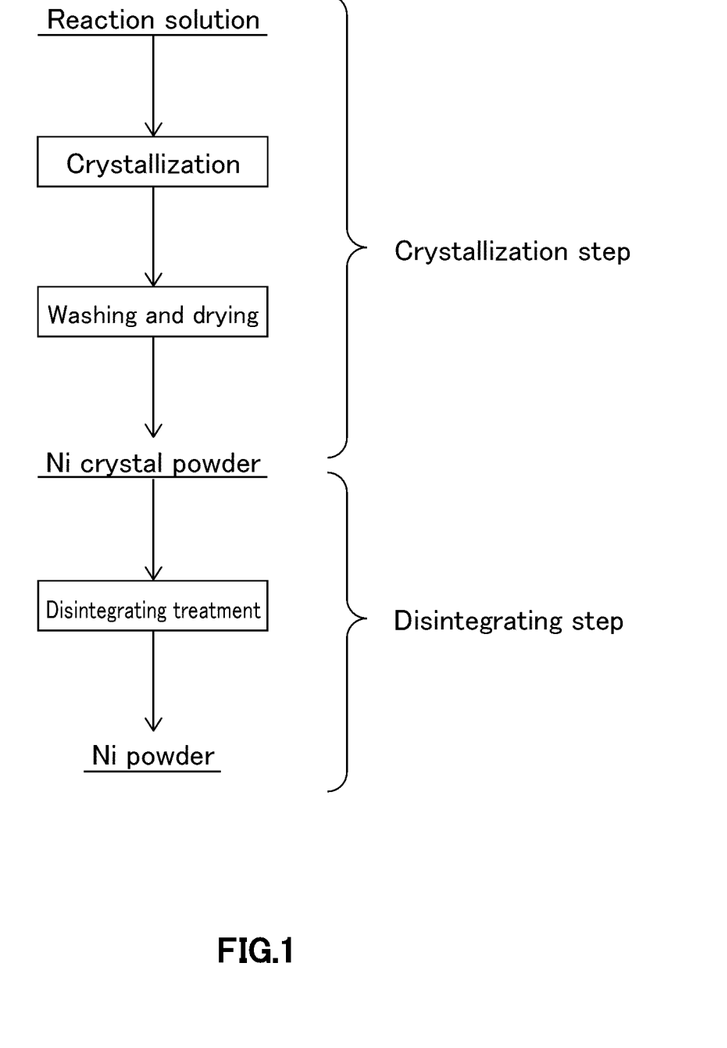
FIG. 1 is a schematic diagram illustrating an example of producing steps in a process for producing nickel powder relating to one embodiment of the present invention.

At first, explaining about a process for producing nickel powder relating to one embodiment of the present invention. FIG. 1 is a schematic diagram illustrating an example of producing steps in a process for producing nickel powder relating to one embodiment of the present invention. The process for producing nickel powder relating to one embodiment of the present invention mainly comprises a crystallization step for obtaining nickel crystal powder with reduction reaction by hydrazine, in reaction solution containing at least water-soluble nickel salt, hydrazine as reducing agent, alkali hydroxide as pH conditioner, if necessary metal salt of metal more noble than nickel, and water, and fine nickel powder is crystallized by blending infinitesimal amount, and also, suitable amount of specific sulfur-containing compound in reaction solution in advance, i.e. before start of reduction reaction. In addition, a disintegrating step performed according to need is added as post-treatment step.

Here, as mentioned above, nickel powder is used as metal powder for internal electrode paste composing a thick film conductor of a laminated ceramic capacitor, and used as low-cost base metal used instead of using high-cost noble metal.

In a step for producing the laminated ceramic capacitor, internal electrode paste composed by mixing and kneading nickel powder, binder resin such as ethyl cellulose, and organic solvent such as terpineol, is screen printed on a dielectric green sheet. The dielectric green sheets, on which internal electrode paste is printed and dried, are laminated such that internal electrode paste printed layer and the dielectric green sheet are superposed alternately and pressure-bonded to obtain a laminated body.

This laminated body is cut in predetermined size, and then, binder resin is removed by heat treatment (debinder treatment), further, this laminated body is calcined at high temperature of about 1300° C. to obtain a ceramic compact.

And, an external electrode is mounted to the obtained ceramic compact to obtain the laminated ceramic capacitor. As base metal such as nickel is used as metal powder in internal electrode paste to be an internal electrode, debinder treatment of the laminated body is performed under atmosphere with extremely low oxygen concentration such as inert atmosphere.

Along with enlargement of capacity and miniaturization of the laminated ceramic capacitor, thinning of the internal electrode and a dielectric substance is progressing. Along with this, micronization of particle size of nickel powder used in internal electrode paste is also progressing, and nickel powder with average particle size equal to or less than 0.5 micrometer is required, and especially, use of nickel powder with average particle size equal to or less than 0.3 micrometer has become mainstream.

As mentioned above, when roughly classified, there are vapor phase process and wet process in a process for producing nickel powder. For example, as vapor phase process, there are a process for producing nickel powder by reducing nickel chloride vapor by hydrogen described in Patent Document 1, and a process for producing nickel powder by vaporizing nickel metal in plasma described in Patent Document 2. In addition, for example, as wet process, there is a process for producing nickel powder by adding reducing agent to nickel salt solution described in Patent Document 3.

Vapor phase process is an effective means for obtaining high property nickel powder excellent in crystallinity as it is high temperature process over about 1000° C., but there is a problem that particle size distribution of obtained nickel powder will be wide. As mentioned above, with respect to thinning of internal electrode, nickel powder with relatively narrow particle size distribution, without coarse particles, and with average particle size equal to or less than 0.5 micrometer is required, so classification treatment by installing expensive classification device will be necessary, in order to obtain such nickel powder by vapor phase process.

In addition, in classification treatment, with the aim of classification point in optional value about 0.6 micrometer to 2 micrometers, it is possible to remove coarse particles larger than classification point, but a part of particles smaller than classification point is also removed simultaneously, so there is a problem that recovery of the product will be decreased significantly. Therefore, in vapor phase process, increase in cost of the product is inevitable including the above expensive equipment installation.

Further, in vapor phase process, when using nickel powder with average particle size equal to or less than 0.2 micrometer, especially equal to or less than 0.1 micrometer, removal of coarse particles by classification treatment itself will be difficult, so it is not possible to cope with further thinning of internal electrode in the future.

On the other hand, there is an advantage in wet process that particle size distribution of obtained nickel powder will be narrow compared to vapor phase process. Especially, in a process for producing nickel powder by adding solution containing hydrazine as reducing agent to solution containing nickel salt and palladium described in Patent Document 3, nickel salt (accurately, nickel ion ($Ni^{2+}$), or nickel complex ion) is reduced by hydrazine in coexistence with metal salt of metal more noble than nickel (nucleating agent), so number of nucleation is controlled (in other words, particle size is controlled), and also, nucleation and particle growth will be uniform, and it is known that fine nickel powder can be obtained. However, by this process, there was a restriction that condition range of reduction reaction suitable for obtaining nickel powder with average particle size less than 0.1 micrometer is narrow.

As other process for producing fine nickel powder by wet process, in Patent Document 4, it is disclosed that, when reacting metal compound of group 10 element such as nickel or group 11 element such as silver with reducing agent such as hydrazine in liquid phase, a process for obtaining metal particle in presence of mercapto carboxylic acid (mercapto propionic acid, mercapto acetic acid, thiodipropionic acid, mercapto succinic acid, dimercapto succinic acid, thiodiglycolic acid, cysteine, and else) is a preferable process for obtaining particularly fine metal colloidal particle by a function of mercapto carboxylic acid at the time of reduction reaction. In example 1, silver colloidal particle with average particle size of about 10 nm (0.01 micrometer) is obtained by adding 1.6 g of 3-mercapto propionic acid to 50 g of silver nitrate (5.1 mol % with respect to 1 mol of silver) and reducing it. However, main purpose of mercapto carboxylic acid or the like is dispersion stability as protective agent of metal particle, so it is necessary to bond or adsorb large quantity of mercapto carboxylic acid or the like on surface of nickel powder, and there was a problem that large quantity of carbon or sulfur derived from mercapo carboxylic acid or the like are contained in nickel powder.

Further, in Patent Document 5, it is disclosed that, when obtaining nickel powder by hydrogen gas reduction of nickel hydroxide ($Ni(OH)_2$), which is neutralized substance of nickel chloride ($NiCl_2$) and NaOH, in liquid phase, it is possible to obtain extremely fine spherical uniform nickel powder with particle size less than about 0.03 micrometer, by performing reduction in presence of sulfide such as hydrogen sulfide, alkali sulfide and alkaline-earth sulfide with sulfur concentration of 2 to 50 mg with respect to 1 mol of nickel hydroxide. In example 2, particle size was about 0.3 micrometer when sulfur component ($Na_2S$) was not added, but in example 1, when sulfur component was added with sulfur concentration (blended as $Na_2S$) of 4 mg with respect to 0.5 mol of nickel (sulfur concentration of 0.025 mol % with respect to 1 mol of nickel), spherical uniform nickel powder with average particle size of about 0.04 micrometer was obtained.

It is possible to obtain fine nickel powder by adding sulfur compound as exemplified in the above, but as large quantity of sulfur compound is added, there was a problem that large quantity of sulfur was contained in obtained nickel powder by involving sulfur component in solution at the time of reduction crystallization.

Considering such circumstances, as a result of keen examination, the inventors have found that fine nickel crystal powder (nickel powder) can be obtained by blending infinitesimal amount, and also, suitable amount of specific sulfur-containing compound in reaction solution in advance, i.e. before start of reduction reaction, in a crystallization step in a process for producing nickel powder by wet process, i.e. in a step for performing reduction reaction in reaction solution containing water-soluble nickel salt, hydrazine as reducing agent, alkali hydroxide as pH conditioner, if necessary metal salt of metal more noble than nickel, and water, and completed the present invention.

In the process for producing nickel powder relating to one embodiment of the present invention, nickel crystal powder produced by reduction reaction can be separated from reaction solution using publicly known procedures, and for example, nickel powder can be obtained via procedures of washing, solid-liquid separation and drying. In addition, if desired, nickel powder (nickel crystal powder) in which catalytic activity of nickel particle is decreased may be obtained by applying surface treatment (sulfur coating treatment) for modifying nickel crystal powder surface with sulfur component, by adding sulfur compound such as mercapto compound or disulfide compound to washing liquid or reaction solution containing nickel crystal powder. In addition, nickel powder can be obtained by performing heat treatment of about 200° C. to 300° C. to obtained nickel powder (nickel crystal powder), for example in inert atmosphere or reducing atmosphere. These sulfur coating treatment and heat treatment are extremely effective when used within appropriate range, as it is possible to control sintering behavior of nickel powder and debinder behavior in internal electrode when producing the laminated ceramic capacitor. Further, it is preferable to obtain nickel powder for reducing coarse particle or the like caused by bonding of nickel particles occurring at nickel particle generating process of a crystallization step, by adding disintegrating step (post-treatment step) for performing disintegrating treatment to nickel powder (nickel crystal powder) obtained by the crystallization step, if necessary.

Hereinafter, explaining in detail about a crystallization step in the process for producing nickel powder relating to one embodiment of the present invention.

(1-1. Crystallization Step)

In a crystallization step, nickel salt (accurately, nickel ion, or nickel complex ion) is reduced by hydrazine in reaction solution in which at least water-soluble nickel salt, reducing agent, alkali hydroxide, if necessary metal salt of metal more noble than nickel, and water are mixed. In the present invention, nickel salt is reduced by hydrazine in presence of sulfur-containing compound, by blending infinitesimal amount, and also, suitable amount of specific sulfur-containing compound in this reaction solution in advance.

(1-1-1. Medicaments Used in Crystallization Step)

In the crystallization step of the present invention, the reaction solution containing water and various medicaments such as nickel salt, reducing agent, alkali hydroxide, and if necessary metal salt of metal more noble than nickel, and which is blended with specific sulfur-containing compound in advance, is used. Water as solvent is preferably with high purity such as ultrapure water (conductivity: ≤0.06 µS/cm (microsiemens per centimeter)) and pure water (conductivity: ≤1 µS/cm), from a point of view of decreasing amount of impurities in obtained nickel powder, and especially, it is preferable to use inexpensive and easily available pure water. Hereinafter, describing about various medicaments respectively.

(a) Nickel Salt

Nickel salt used in the present invention is not limited especially, as long as it is water-soluble nickel salt easily soluble to water, and it is possible to use one or more selected from nickel chloride ($NiCl_2$), nickel sulfate ($NiSO_4$) and nickel nitrate ($Ni(NO_3)_2$). Among these nickel salts, nickel chloride, nickel sulfate or mixture thereof is more preferable, from a point of view of cost, easiness of operation and availability.

(b) Reducing Agent

In the process for producing nickel powder relating to one embodiment of the present invention, hydrazine ($N_2H_4$, molecular weight: 32.05) is used as reducing agent. In addition, in hydrazine, there is hydrazine hydrate ($N_2H_4 \cdot H_2O$, molecular weight: 50.06) other than anhydrous hydrazine, but either may be used. Reduction reaction of hydrazine is as indicated in following reaction formula (2), and it is having characteristics that reduction power is high especially in alkalinity, impurity component will not be generated in reaction solution as byproduct of reduction reaction is nitrogen gas and water, there is few impurities in hydrazine, and it is easily available, so it is suitable for reducing agent, and for example, commercially available industrial grade 60 mass % hydrazine hydrate can be used.

(c) Alkali Hydroxide

Reduction power of hydrazine becomes stronger as alkalinity of reaction solution is stronger (refer to following reaction formula (2)), so in the process for producing nickel powder relating to one embodiment of the present invention, alkali hydroxide is used as pH conditioner for increasing alkalinity. Alkali hydroxide is not limited especially, but it is preferable to use alkali metal hydroxide from aspects of cost and easiness of availability, and concretely, it is preferable to be one or more selected from sodium hydroxide (NaOH) and potassium hydroxide (KOH).

Blending quantity of alkali hydroxide is such that pH of reaction solution in reaction temperature will be 9.5 or more, preferably 10 or more, more preferably 10.5 or more, so that reduction power of hydrazine as reducing agent will be increased sufficiently.

(d) Sulfur-Containing Compound

In the process for producing nickel powder relating to one embodiment of the present invention, infinitesimal amount, and also, suitable amount of specific sulfur-containing compound explained in below is blended in reaction solution in advance. Used sulfur-containing compound is a compound having any of sulfur-containing functional group structure represented by —SH, sulfur-containing functional group structure represented by —S—S—, sulfur-containing functional group structure represented by —O—S(=S)(=O)—O— at least in molecule, and it may be organic compound or inorganic compound. In addition, as illustrated in chemical formula 1, in —S—S—, not only simple —S—S— sulfur-containing functional group structure, but also includes sulfur-containing functional group structure in which other elements are bonded at both sides of S.

Here, X is an element such as O.

As organic compound having sulfur-containing functional group structure represented by —SH, thioglycolic acid (mercapto acetic acid) (HOOCCH$_2$SH), thiomalic acid (mercapto succinic acid) (HOOCCH(SH)CH$_2$COOH), mercapto propionic acid (HOOCC$_2$H$_4$SH) and else can be used. As inorganic compound, sodium hydrogen sulfide (NaSH) and else can be used. It is more preferable to use one or more selected from thioglycolic acid, thiomalic acid and sodium hydrogen sulfide.

As organic compound having sulfur-containing functional group structure represented by —S—S—, dithioglycolic acid (dithiodiacetic acid) (HOOCCH$_2$SSCH$_2$COOH), dimethyl disulfide (CH$_3$SSCH$_3$), 2,2'-dipyridyl disulfide ((C$_5$H$_4$N)SS(C$_5$H$_4$N)) and else having disulfide group (—S—S—) can be used. It is more preferable to use one or more selected from dithioglycolic acid and dimethyl disulfide.

As organic compound having sulfur-containing functional group structure represented by —O—S(=S)(=O)—O—, thiosulfuric acid (H$_2$S$_2$O$_3$), sodium thiosulfate (Na$_2$S$_2$O$_3$), potassium thiosulfate (K$_2$S$_2$O$_3$), copper thiosulfate (CuS$_2$O$_3$), nickel thiosulfate (NiS$_2$O$_3$), palladium thiosulfate (PdS$_2$O$_3$) and else can be used. It is more preferable to use one or more selected from thiosulfuric acid, sodium thiosulfate and potassium thiosulfate.

These sulfur-containing compound forms for example Ni—S— bond on surface of nickel particle of initial nucleus precipitated at initial stage for reduction precipitation of nickel, and decreases particle growth rate of initial nucleus, so degree of supersaturation of reduction reaction will be maintained at high level and initial nucleation continue to occur for long time, for example for few minutes, so it is considered that fine nickel crystal powder (nickel powder) can be obtained.

In addition, the bond of Ni—S— is basically generated by a bond between nickel particle surface and —SH, but also in —S—S— and —O—S(=S)(=O)—O—, —SH is generated by cleaving or the like in these functional groups (—S—S—→—SH+HS—, —O—S(=S)(=O)—O—→HS—S(=O)$_2$—O—), and it is considered that the bond of Ni—S— can be formed as well. In addition, sulfide group (—S—) differs from disulfide group (—S—S—) and such cleaving in functional group tends not to occur, so even by blending infinitesimal amount of sulfide group in the present invention, it is not possible to form bond of Ni—S— effectively, and effect to micronize nickel particle cannot be obtained.

As mentioned above, number of formed Ni—S— bond differs by type of sulfur-containing functional group contained in sulfur-containing compound, and when considering its formation ability as an effective multiplication factor (B) [magnification] of sulfur-containing functional group, it can be considered that the effective multiplication factor (B) will be 1 in —SH, 2 in —S—S—, and 1 in —O—S(=S)(=O)—O—.

About addition amount of the sulfur-containing compound in reaction solution, it is necessary to consider the effective multiplication factor (B) of the sulfur-containing functional group, and when a ratio of substance quantity of sulfur-containing compound and nickel ((molar number of sulfur-containing compound/molar number of nickel)*10$^6$) is A [molar ppm], and when metal salt of metal more noble than nickel (nucleating agent) described in below is not used, a product (A*B) of the ratio (A) of substance quantity of sulfur-containing compound and nickel and the effective multiplication factor (B) of sulfur-containing functional group will be in a range of 0.1 molar ppm to 30 molar ppm (corresponds to C=0 in following formula 1), preferably 0.5 molar ppm to 20 molar ppm, and it will be infinitesimal amount. When the A*B is less than 0.1 molar ppm, quantity of sulfur-containing compound will be too small, and it will not be able to obtain fine nickel crystal powder (nickel powder). On the other hand, when metal salt of metal more noble than nickel (nucleating agent) is not used, and when the A*B is more than 30 molar ppm, bonding amount of sulfur compound to initial nucleus surface in initial stage of nickel reduction becomes too high to cover the surface, and particle growth rate will be decreased significantly, and crystallization reaction time will be extended significantly, so it is not preferable.

In addition, as the ratio (A) of substance quantity of sulfur-containing compound with respect to nickel is extremely low as mentioned above, mixing amount of sulfur to nickel crystal powder (nickel powder) by adding and mixing sulfur-containing compound to reaction solution is negligibly small (sulfur content is less than 0.01 mass %).

(e) Metal Salt of Metal More Noble than Nickel

By containing metal more noble than nickel in reaction solution along with the sulfur-containing compound, metal more noble than nickel will be reduced at first, when reducing and precipitating nickel, and functions as nucleating agent, which will be initial nucleus, and it is possible to produce fine nickel crystal powder (nickel powder) by particle growth of this initial nucleus.

As metal salt of metal more noble than nickel, water-soluble noble metal salt such as water-soluble copper salt, gold salt, silver salt, platinum salts, palladium salt, rhodium salt and iridium salt can be cited. For example, it is possible to use copper sulfate as water-soluble copper salt, silver nitrate as water-soluble silver salt, and palladium chloride (II) sodium, palladium chloride (II) ammonium, palladium nitrate (II), palladium sulfate (II) and else as water-soluble palladium salt, but it is not limited to these compounds.

As metal salt of metal more noble than nickel, it is especially preferable to use the above palladium salt, as it is possible to control particle size of obtained nickel powder to be finer.

Here, when a ratio of substance quantity of the metal salt of metal more noble than nickel and nickel ((molar number of metal salt of metal more noble than nickel/molar number of nickel)*$10^6$) is C [molar ppm], and when using palladium salt, although it depends on the desired average particle size of nickel powder, blending quantity (C) of palladium salt (ratio of substance quantity of metal salt of metal more noble than nickel with respect to nickel) is in a range of 0.2 molar ppm to 100 molar ppm, preferably 0.5 molar ppm to 60 molar ppm, for example, if average particle size of nickel crystal powder (nickel powder) is less than 0.1 micrometer. When the above ratio is less than 0.2 molar ppm, it will be very difficult to control the particle size to be less than 0.1 micrometer stably, even by micronizing nickel crystal powder (nickel powder) by blending sulfur-containing compound, on the other hand, when the above ratio is more than 100 molar ppm, expensive palladium salt will be used in large quantity, and cost of nickel powder will be increased.

Figure 2:
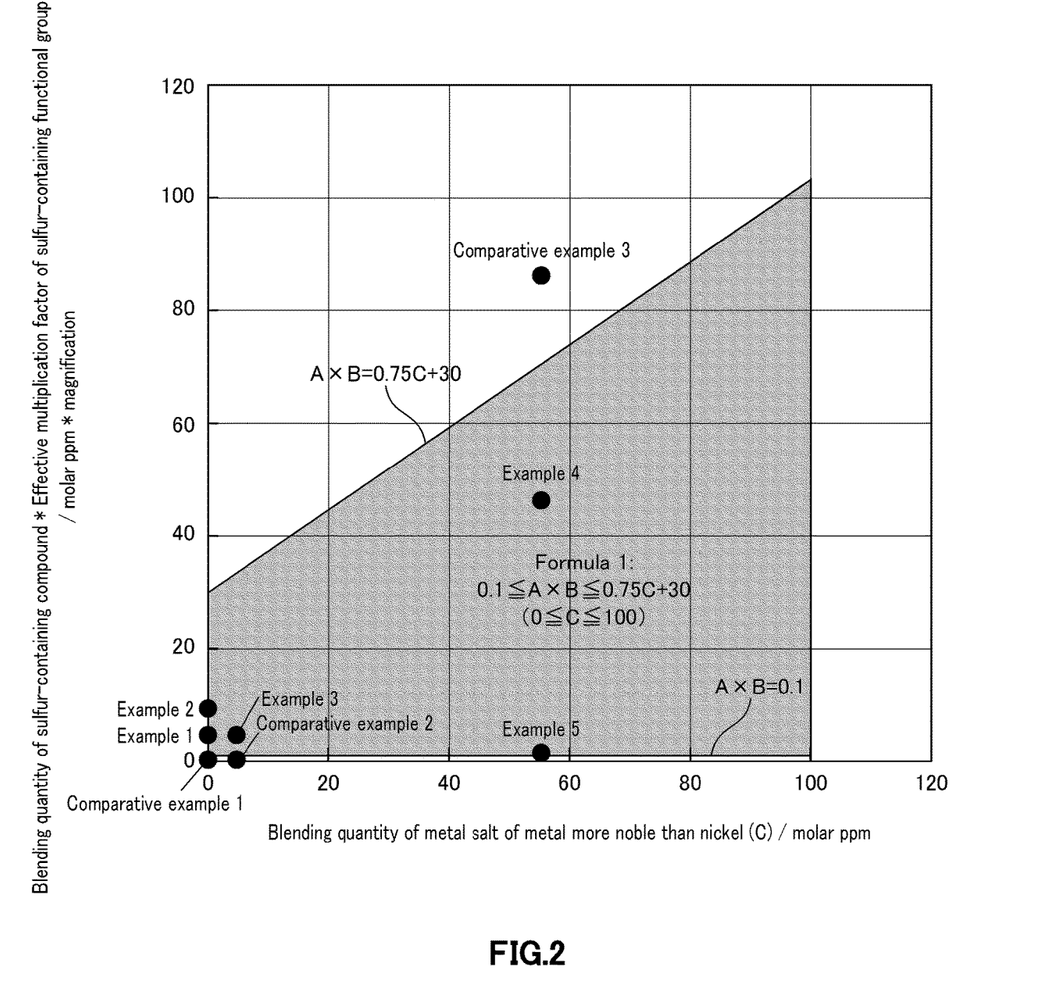
FIG. 2 is a diagram illustrating an appropriate region in a product (A*B) of a ratio (A) of substance quantity of sulfur-containing compound and nickel (blending ratio of sulfur-containing compound) and an effective multiplication factor (B) of sulfur-containing functional group [molar ppm*magnification] and a ratio (C) of substance quantity of metal salt of metal more noble than nickel and nickel (blending ratio of metal salt of metal more noble than nickel) [molar ppm] (Formula 1: $0.1 \leq A*B \leq 0.75C+30$ ($0 \leq C \leq 100$)), and illustrating whether or not each example and each comparative example are corresponding to the appropriate region.

Here, a relation in the ratio (A) of substance quantity of sulfur-containing compound and nickel [molar ppm], the effective multiplication factor (B) of sulfur-containing functional group [magnification], and the ratio (C) of substance quantity of the metal salt of metal more noble than nickel and nickel [molar ppm] is preferable to satisfy a formula 1 (refer to FIG. 2), and more preferable to satisfy a formula 2, including presence or absence of blending of metal salt of metal more noble than nickel (for example, palladium salt) into reaction solution.

$$0.1 \leq A*B \leq 0.75C+30 (0 \leq C \leq 100) \quad \text{(Formula 1)}$$

$$0.1 \leq A*B \leq 0.75C+20 (0 \leq C \leq 100) \quad \text{(Formula 2)}$$

The sulfur-containing compound slows down particle growth rate by bonding to nickel particle surface, which will be initial nucleus, as explained in the above, but it will be reduced earlier than nickel and slows down particle growth rate by bonding also to palladium particle, which will be initial nucleus, as well, so excess presence of sulfur-containing compound decreases particle growth rate of initial nucleus significantly, and extends crystallization reaction time significantly, so it is not preferable. Therefore, from point of view of maintaining realistic particle growth rate and promoting micronization by decreasing and inhibiting degree of supersaturation in reduction reaction, it is preferable to satisfy the formula 1, and it is more preferable to satisfy the formula 2.

(f) Amine Compound

Amine compound is having functions of autolysis inhibitor of hydrazine, accelerator of reduction reaction, and coupling inhibitor of nickel particles themselves, and it is a compound containing two or more of any of functional group selected from primary amino group ($-NH_2$) or secondary amino group ($-NH-$) in molecule. Especially, when amine compound is blended in reaction solution in advance, function of this amine compound as accelerator of reduction reaction enables to crystallize fine nickel crystal powder (nickel powder) stably, by synergic effect with functions of the sulfur-containing compound and metal salt of metal more noble than nickel.

Amine compound is at least any of alkylene amine or alkylene amine derivative. More concretely, alkylene amine is one or more selected from ethylene diamine ($H_2NC_2H_4NH_2$), diethylene triamine ($H_2NC_2H_4NHC_2H_4NH_2$), triethylene tetramine ($H_2N(C_2H_4NH)_2C_2H_4NH_2$), tetraethylene pentamine ($H_2N(C_2H_4NH)_3C_2H_4NH_2$), and pentaethylen hexamine ($H_2N(C_2H_4NH)_4C_2H_4NH_2$), and alkylene amine derivative is one or more selected from tris (2-aminoethyl) amine ($N(C_2H_4NH_2)_3$), (2-aminoethyl) aminoethanol ($H_2NC_2H_4NHC_2H_4OH$), and ethylene diamine-N, N'-diacetic acid (ethylene-N, N'-diglycine) ($HOOCCH_2NHC_2H_4NHCH_2COOH$). These alkylene amine and alkylene amine derivative are soluble to water, and especially, ethylene diamine and diethylene triamine are preferable as they are easily available and inexpensive.

Function of the amine compound as accelerator of reduction reaction is considered to be according to action as complexing agent for forming nickel complex ion by complexing nickel ion ($Ni^{2+}$) in reaction solution, but about functions as autolysis inhibitor of hydrazine and as coupling inhibitor of nickel particles themselves, detailed mechanism of action is not clarified yet. It is assumed that the function is achieved by some kind of synergic effect between primary amino group ($-NH_2$) or secondary amino group ($-NH-$) in amine compound molecule and surface of nickel crystal powder in reaction solution.

Here, ratio [mol %] of substance quantity of the amine compound and nickel in reaction solution (molar number of amine compound/molar number of nickel×100) is in a range of 0.01 mol % to 5 mol %, preferably in a range of 0.03 mol % to 2 mol %. When the ratio is less than 0.01 mol %, the amine compound will be too little, so each function of autolysis inhibitor of hydrazine, accelerator of reduction reaction, and coupling inhibitor of nickel particles themselves cannot be achieved. On the other hand, when the ratio is more than 5 mol %, as a result of action as complexing agent for forming nickel complex ion becomes too strong, characteristic deterioration of nickel powder occurs, for example, granularity and sphericity of nickel powder will be lost by causing abnormality to particle growth and nickel powder becomes irregular shape, and many coarse particles in which nickel particles themselves are coupled to each other will be formed.

(g) Other Inclusion

In reaction solution of crystallization step, as mentioned above, it is possible to contain metal salt of metal more noble than nickel and amine compound, in addition to nickel salt, reducing agent (hydrazine), alkali hydroxide, and sulfur-containing compound, and further, it is possible to contain a little amount of each additive, such as dispersing agent, complexing agent and defoaming agent. If appropriate amount of appropriate dispersing agent or complexing agent is used, there is a case that granularity (sphericity) or particle surface smoothness of nickel crystal powder can be improved, and that coarse particles can be decreased. In addition, if appropriate amount of appropriate defoaming agent is used, it will be possible to inhibit foaming in crystallization step caused by nitrogen gas (refer to following reaction formulas (2) to (4)) generated in crystallization reaction. Border line between dispersing agent and complexing agent is obscure, but as dispersing agent, publicly known substances can be used, and for example, alanine ($CH_3CH(COOH)NH_2$), glycine ($H_2NCH_2COOH$), triethanol amine (N(C$_2$H$_4$OH)$_3$), diethanol amine (iminodiethanol) (NH(C$_2$H$_4$OH)$_2$) can be cited. As complexing agent, publicly known substances can be used, and hydroxy carboxylic acid, carboxylic acid (organic acid containing at least one carboxyl group), hydroxy carboxylate or hydroxy carboxylic acid derivative, carboxylate or carboxylic acid derivative, concretely, tartaric acid, citric acid, malic acid, ascorbic acid, formic acid, acetic acid, pyruvic acid, and these salts or derivatives can be cited.

(1-1-2. Crystallization Procedure)

In crystallization procedure of the present invention, nickel salt solution, in which at least water-soluble nickel salt is dissolved in water, and reducing agent solution, in which reducing agent (hydrazine) is dissolved in water, alkali hydroxide solution, in which alkali hydroxide is dissolved in water, and sulfur-containing compound solution, in which sulfur-containing compound is dissolved in water, are prepared, and these are added and mixed to prepare reaction solution containing sulfur-containing compound, and crystallization reaction will be performed in this reaction solution. In addition, reaction solution may be prepared by adding and mixing metal salt of metal more noble than nickel to nickel salt solution in advance. Amine compound is added and mixed to any of these solutions or mixed solution of these solutions before preparing the reaction solution, or amine compound is added and mixed to the reaction solution after it is prepared. In addition, reduction reaction starts when the reaction solution is prepared.

Figure 3:
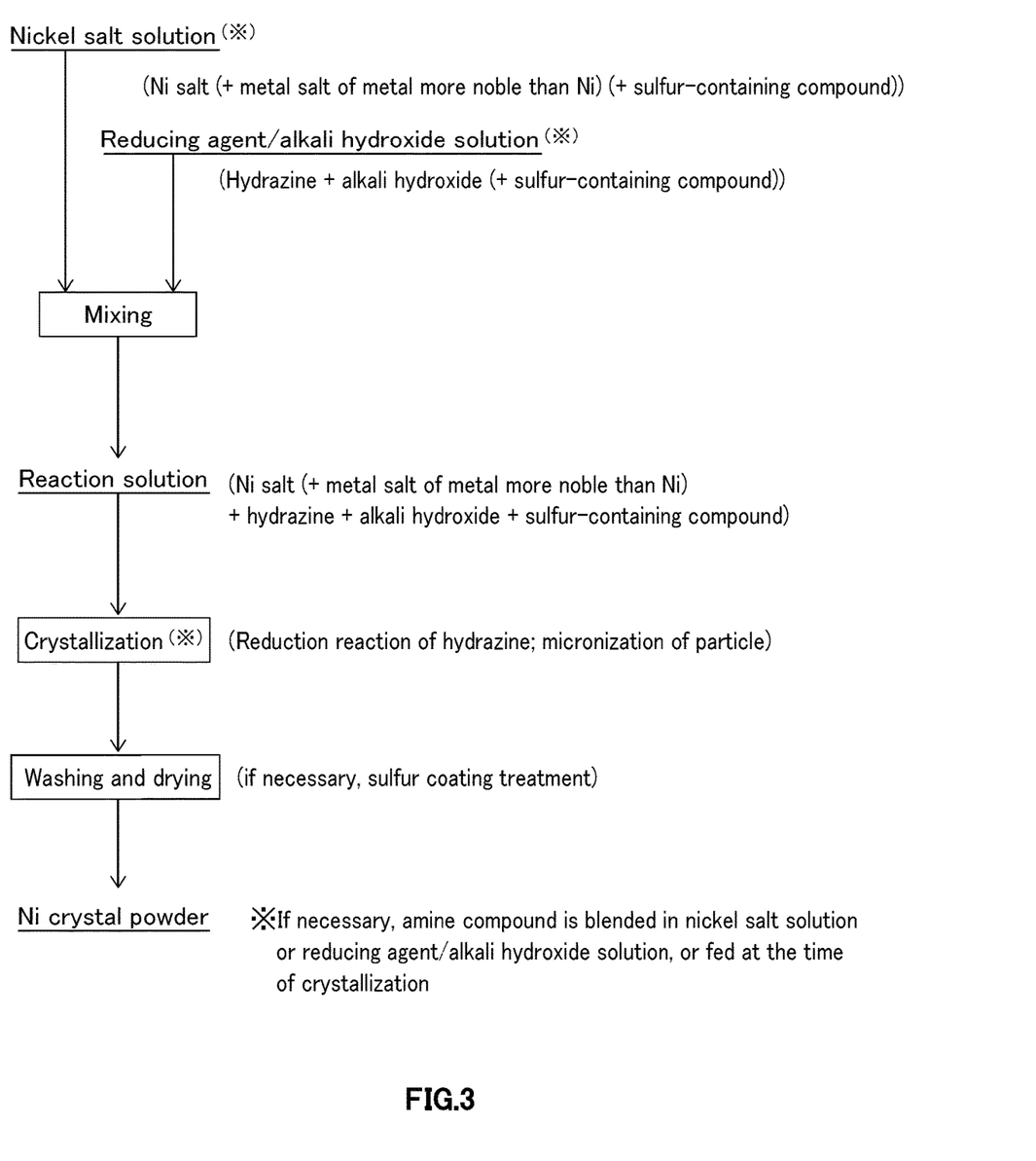
FIG. 3 is a schematic diagram illustrating an example of crystallization procedure relating to embodiment of a crystallization step in the process for producing nickel powder relating to one embodiment of the present invention.
Figure 4:
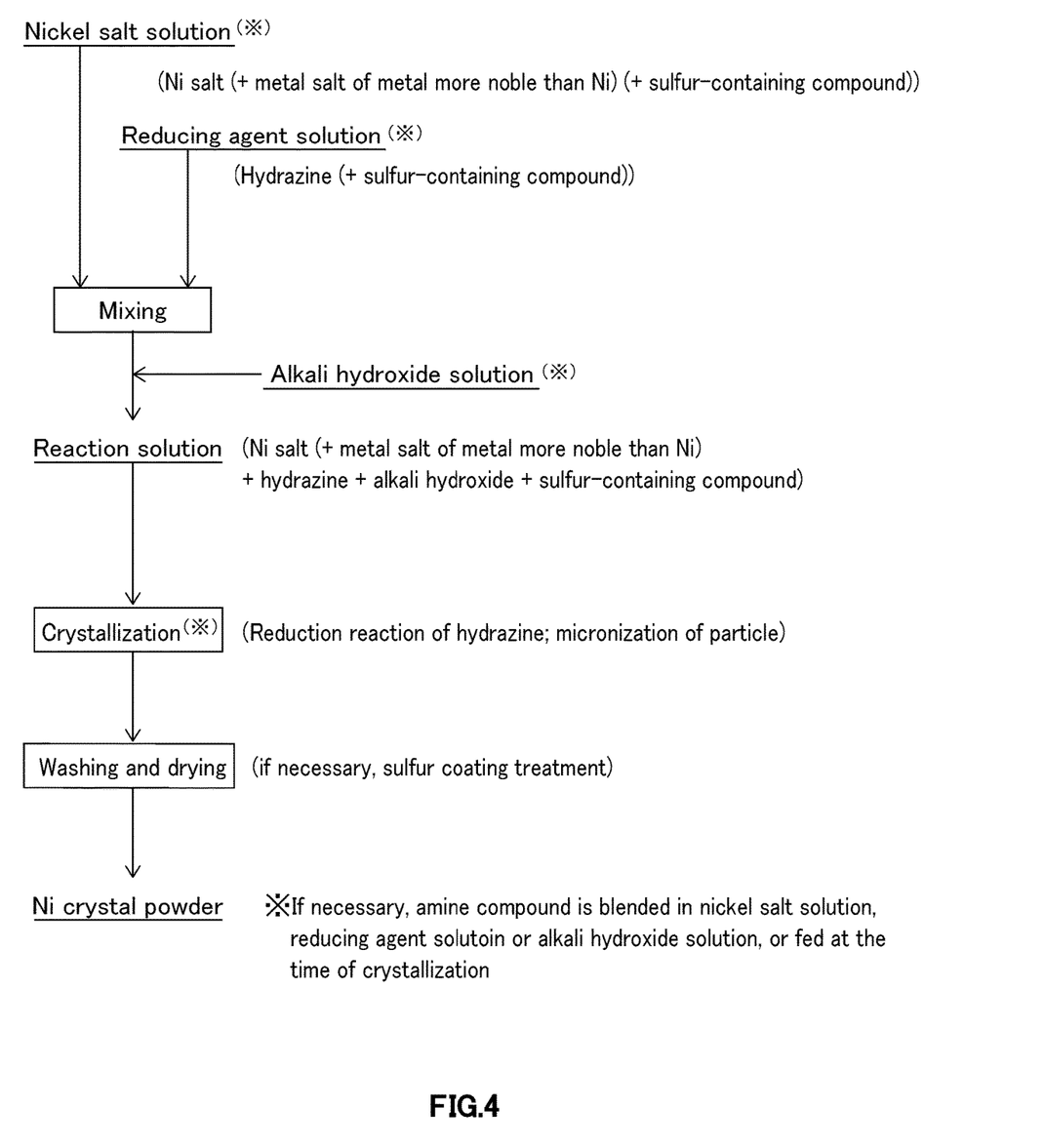
FIG. 4 is a schematic diagram illustrating other example of crystallization procedure relating to embodiment of a crystallization step in the process for producing nickel powder relating to one embodiment of the present invention.

Here, as concrete crystallization procedure, there are two types of procedures: a procedure to prepare reaction solution by adding and mixing reducing agent/alkali hydroxide solution, in which reducing agent (hydrazine) and alkali hydroxide are added and mixed in advance, to nickel salt solution containing nickel salt which is a substance to be reduced (sulfur-containing compound solution is added and mixed to any of the above solutions: refer to FIG. 3); and a procedure to prepare reaction solution by adding and mixing alkali hydroxide solution to nickel salt/reducing agent-containing solution, in which reducing agent (hydrazine) is added and mixed to nickel salt solution containing nickel salt which is a substance to be reduced (sulfur-containing compound solution is added and mixed to any of the above solutions: refer to FIG. 4). There is a difference that, in the former, reducing agent (hydrazine) with increased reduction power by increasing alkalinity by alkali hydroxide is added and mixed to nickel salt solution, on the other hand, in the latter, reduction power is increased by adjusting pH by alkali hydroxide after mixing reducing agent (hydrazine) to nickel salt solution.

In the former case, depending on a temperature (reaction starting temperature) when reaction solution is prepared, i.e. when reduction reaction has started, but if time required for adding and mixing reducing agent/alkali hydroxide solution, in which alkalinity is increased by alkali hydroxide, to nickel salt solution becomes longer, from midpoint of addition and mixing, alkalinity will be increased at a part of addition and mixing region of nickel salt solution and reducing agent/alkali hydroxide solution and reduction power of hydrazine will be increased, and there will be a time difference in nucleation and it tends not to be able to obtain narrow particle size distribution or achieve micronization of nickel crystal powder. This tendency is more clearly shown when alkaline reducing agent/alkali hydroxide solution is added and mixed to weak-acidic nickel salt solution. The tendency can be inhibited as raw material mixing time is shorter, so it is desirable to be short time, but considering restriction in aspect of mass-production facility, it is preferably 10 to 180 seconds, more preferably 20 to 120 seconds, further more preferably 30 to 80 seconds.

On the other hand, in the latter case, in nickel salt/reducing agent-containing solution containing reducing agent and substance to be reduced, hydrazine as reducing agent is previously added and mixed to be in uniform concentration, so time difference in nucleation occurring when adding and mixing alkali hydroxide solution will not be large as in the former case, so it is characterized by that it tends to obtain narrow particle size distribution and achieve micronization of nickel crystal powder. However, by similar reason as in the former case, alkali hydroxide mixing time is desirable to be short time, and considering restriction in aspect of mass-production facility, it is preferably 10 to 180 seconds, more preferably 20 to 120 seconds, further more preferably 30 to 80 seconds.

Also, about addition and mixing of amine compound of the present invention, as mentioned above, there are two types of procedures: a procedure to blend amine compound in reaction solution before reaction solution is prepared; and a procedure to add and mix amine compound to reaction solution after reaction solution is prepared and after start of reduction reaction (refer to FIGS. 3 and 4).

In the former case, there is an advantage that amine compound functions as autolysis inhibitor of hydrazine and accelerator of reduction reaction (complexing agent) from start of reduction reaction, as amine compound is previously blended in reaction solution, but on the other hand, interaction of amine compound with surface of nickel particles, for example adsorption, will be involved with nucleation, and there is a possibility that it influences particle size distribution or particle size of obtained nickel crystal powder.

Adversely, in the latter case, amine compound is added and mixed to reaction solution after going through initial stage of crystallization step in which nucleation occurs, so functions of amine compound as autolysis inhibitor of hydrazine and accelerator of reduction reaction (complexing agent) will be exerted little late, but amine compound will not be involved with nucleation, so particle size distribution or particle size of obtained nickel crystal powder tends not to be influenced by amine compound, and there is an advantage that it will be easy to control particle size distribution or particle size of obtained nickel crystal powder. Here, mixing time when adding and mixing amine compound to reaction solution in this procedure may be added at once within few seconds, or may be added separately or added by dripping over few minutes to 30 minutes. Amine compound also functions as accelerator of reduction reaction (complexing agent), so crystal growth will progress gradually when it is added gradually and nickel crystal powder will be having high crystallinity, but autolysis inhibition of hydrazine also functions gradually and effect of reducing used amount of hydrazine will be decreased, so the mixing time may be decided accordingly while trying to balance these matters. In addition, about adding and mixing timing of amine compound in the former procedure, it can be selected accordingly by comprehensively determining according to purpose.

Addition and mixing of nickel salt solution and reducing agent/alkali hydroxide solution, or addition and mixing of alkali hydroxide solution to nickel salt/reducing agent-containing solution is preferable to be stirring-mixing in which it is mixed while stirring solution. If it is easy to be stirred and mixed, it depends on location of nucleation but non-uniformity will be decreased, and also, the dependency of nucleation on raw material mixing time or alkali hydroxide mixing time will be decreased, so it will be easier to obtain narrow particle size distribution and achieve micronization of nickel crystal powder. As process of stirring-mixing, publicly known process can be used, and it is preferable to use stirring blade from aspects of facility cost or control of stirring-mixing.

(1-1-3. Reduction Reaction)

In crystallization step, nickel crystal powder is obtained by reducing nickel salt with hydrazine in reaction solution, in coexistence of infinitesimal amount, and also, suitable amount of specific sulfur-containing compound, alkali hydroxide, and if necessary metal salt of metal more noble than nickel (nucleating agent). In addition, if necessary, reduction reaction is performed while inhibiting autolysis of hydrazine significantly by a function of infinitesimal amount of specific amine compound.

At first, explaining about reduction reaction in crystallization step. Reaction of nickel (Ni) is two-electron reaction of following reaction formula (1), and reaction of hydrazine ($N_2H_4$) is four-electron reaction of following reaction formula (2), and for example, as mentioned above, when nickel chloride is used as nickel salt and when sodium hydroxide is used as alkali hydroxide, entire reduction reaction is represented by following reaction formula (3), as reaction in which nickel hydroxide ($Ni(OH)_2$) generated by neutralization reaction of nickel chloride and sodium hydroxide is reduced by hydrazine, and stoichiometrically, 0.5 mol of hydrazine ($N_2H_4$) is required for 1 mol of nickel (Ni).

Here, from reduction reaction of hydrazine of the reaction formula (2), it can be understood that reduction power of hydrazine becomes stronger as alkalinity is stronger. The alkali hydroxide is used as pH conditioner for increasing alkalinity, and serves to accelerate reduction reaction of hydrazine.

$$Ni^{2+}+2e^- \rightarrow Ni\downarrow \text{ (Two-electron reaction)} \quad (1)$$

$$N_2H_4 \rightarrow N_2\uparrow +4H^+4e^- \text{ (Four-electron reaction)} \quad (2)$$

$$2NiCl_2+N_2H_4+4NaOH \rightarrow 2Ni(OH)_2+N_2H_4+ \\ 4NaCl \rightarrow 2Ni\downarrow +N_2\uparrow +4NaCl+4H_2O \quad (3)$$

As mentioned above, in conventional crystallization step, active surface of nickel crystal powder will be catalyst, and autolysis reaction of hydrazine indicated in following reaction formula (4) will be accelerated, and large quantity hydrazine as reducing agent will be consumed for other than reduction, so it depends on crystallization condition such as reaction starting temperature, but for example, about 2 mol of hydrazine were generally used with respect to 1 mol of nickel, and about four times the ideal value of hydrazine required for reduction was used. Further, autolysis of hydrazine by reaction formula (4) creates a lot of ammonia as byproduct, and ammonia will be contained in high concentration in reaction solution to generate nitrogen-containing waste liquid. Such excessive use of hydrazine which is expensive medicament, and occurrence of cost for treating nitrogen-containing waste liquid were causes of increase in cost of nickel power produced by wet process (wet type nickel powder).

$$3N_2H_4 \rightarrow N_2\uparrow +4NH_3 \quad (4)$$

Here, in the process for producing nickel powder, it is preferable to decrease used amount of hydrazine expensive as medicament significantly, by inhibiting autolysis reaction of hydrazine significantly, by adding infinitesimal amount of specific amine compound to reaction solution. The detailed mechanism of this feature has not been clarified yet, but (I) molecules of the specific amine compound adsorb to surface of nickel crystal powder in reaction solution, and preventing contact between active surface of nickel crystal powder and hydrazine molecules, (II) molecules of specific amine compound functions to surface of nickel crystal powder to inactivate catalytic activity of the surface, and else can be considered.

In addition, in crystallization step of conventional wet process, in order to shorten reduction reaction time to a practical range, complexing agent for improving ionic nickel concentration by forming complex ion and nickel ion ($Ni^{2+}$) such as tartaric acid or citric acid is generally used as accelerator of reduction reaction, but these complexing agents such as tartaric acid and citric acid are scarcely having function of autolysis inhibitor of hydrazine as the specific amine compound, or scarcely having function of coupling inhibitor for inhibiting formation of coarse particle formed by coupling of nickel particles themselves in crystallization.

On the other hand, the specific amine compound also functions as complexing agent as well as tartaric acid or citric acid, and it is having an advantage that it is having all functions of autolysis inhibitor of hydrazine, coupling inhibitor, and accelerator of reduction reaction.

(1-1-4. Reaction Starting Temperature)

As crystallization condition of crystallization step, a temperature of reaction solution when reaction solution at least containing nickel salt, hydrazine, alkali hydroxide, and if necessary metal salt of metal more noble than nickel is blended, in other words, a temperature of reaction solution when reduction reaction is started is preferably 40° C. to 90° C., more preferably 50° C. to 80° C., and further, more preferably 60° C. to 70° C. In addition, hereinafter, the temperature of reaction solution when reduction reaction is started may be called reaction starting temperature. A temperature of each solution such as nickel salt solution, reducing agent solution and alkali hydroxide solution can be set freely without limitation as long as the reaction starting temperature of reaction solution obtained by mixing these solutions is in the above temperature range. It tends to accelerate reduction reaction, and also, nickel crystal powder is highly crystallized when the reaction starting temperature is higher, but on the other hand, there is an aspect that autolysis reaction of hydrazine is accelerated more, so consumed amount of hydrazine will be increased, and also, reaction solution tends to foam intensely. Therefore, when the reaction starting temperature is too high, there is a case that consumed amount of hydrazine will be increased significantly, and that crystallization reaction cannot be continued due to large amount of foaming. On the other hand, when the reaction starting temperature is too low, crystallinity of nickel crystal powder tends to decrease significantly, and productivity tends to decrease as time of crystallization step will be prolonged significantly as reduction reaction is delayed. From reasons above, by making the reaction starting temperature in the above temperature range, it is possible to produce high-performance nickel crystal powder inexpensively, while maintaining high productivity, and also, while inhibiting consumed amount of hydrazine.

(1-1-5. Recovery of Nickel Crystal Powder)

As mentioned above, nickel crystal powder generated in reaction solution with reduction reaction by hydrazine may be separated from reaction solution using publicly known procedures, after applying sulfur coating treatment by sulfur compound such as mercapto compound or disulfide compound, according to need. As concrete process, nickel crystal powder is solid-liquid separated from reaction solution using Denver filter, filter press, centrifugal separator, decanter and else, and also, washed sufficiently using high purity water such as pure water (conductivity: ≤1 μS/cm), and dried in 50° C. to 300° C., preferably in 80° C. to 150° C. using generic drying device such as air dryer, hot air dryer, inert gas atmosphere dryer, and vacuum dryer, to obtain nickel crystal powder (nickel powder). In addition, when it is dried in about 200° C. to 300° C. in inert gas atmosphere, reducing atmosphere, vacuum atmosphere or the like, by using drying device such as inert gas atmosphere dryer and vacuum dryer, it is possible to obtain nickel crystal powder (nickel powder) applied with heat treatment, in addition to simple drying.

(1-2. Disintegrating Step (Post-Treatment Step))

As mentioned above, in nickel crystal powder (nickel powder) obtained in crystallization step, content ratio of coarse particles formed by nickel particles coupling to each other during reduction precipitation is not so high at the first place, as amine compound functions as coupling inhibitor of nickel particles during crystallization. However, depending on crystallization procedure or crystallization condition, there is a case that it will be a problem as content ratio of coarse particle will be high to some extent, so it is preferable to reduce coarse particles by separating coarse particles in which nickel particles are coupled by its coupling portion, by arranging disintegrating step after crystallization step. As disintegrating step, dry type disintegrating process such as spiral jet disintegrating treatment or counter jet mill disintegrating treatment, or wet type disintegrating process such as high pressure fluid collision disintegrating treatment, or other generic disintegrating process can be applied.

<2. Nickel Powder>

Nickel powder obtained by process for producing nickel powder relating to one embodiment of the present invention can be obtained by wet process in which used amount of hydrazine as reducing agent is decreased significantly, and it is inexpensive and also having high-performance, so it is suitable for the internal electrode of the laminated ceramic capacitor. As characteristics of nickel powder, there are average particle size and content of impurities (chlorine content, alkali metal content, sulfur content), as below, and nickel powder obtained by one embodiment of the present invention is having following characteristics.

(Average Particle Size)

Recently, there are many types of laminated ceramic capacitor, and nickel powder with average particle size in the order of more than 0.2 micrometer and less than 0.4 micrometer is still used widely, but from a point of view of coping with thinning of the internal electrode of the laminated ceramic capacitor recently, as nickel powder relating to one embodiment of the present invention, average particle size is preferably 0.02 micrometer to 0.2 micrometer, more preferably 0.02 micrometer to 0.15 micrometer. Average particle size of nickel powder relating to one embodiment of the present invention is particle size of number average calculated from scanning electron micrograph (SEM image) of nickel powder obtained by the crystallization step.

(Content of Impurities (Chlorine Content, Alkali Metal Content, Sulfur Content))

In nickel powder by wet process, chlorine and alkali metal are contained, and which are impurities caused by medicament. There is a possibility that these impurities will be a cause of occurrence of defect of the internal electrode when producing the laminated ceramic capacitor, so it is preferable to reduce impurities as possible, and concretely, it is preferable that both chlorine content and alkali metal content are 0.01 mass % or less. Regarding sulfur, as mentioned above, there is a case to improve debinder behavior in internal electrode of laminated ceramic capacitor, by performing sulfur coating treatment to modify nickel crystal powder surface by sulfur component intentionally, but it cannot be denied that there is a possibility to be a cause of occurrence of defect of internal electrode, so it is necessary to reduce impurities as possible at the stage of nickel crystal powder without the sulfur coating treatment, and it is preferable that sulfur content is 0.01 mass % or less.

EXAMPLES

Next, explaining concretely about the present invention by using examples, but the present invention should not be limited by the following examples.

Example 1

[Preparation of Nickel Salt Solution]

405 g of nickel chloride hexahydrate ($NiCl_2.6H_2O$, molecular weight: 237.69) as nickel salt was dissolved in 1880 mL of pure water, and nickel salt solution was prepared.

[Preparation of Reducing Agent Solution]

Commercially available industrial grade 60% hydrazine hydrate (made of Otsuka-MGC Chemical Company, Inc.) in which hydrazine hydrate ($N_2H_4.H_2O$, molecular weight: 50.06) as reducing agent was diluted to 1.67 times by pure water was weighed of 215 g, and reducing agent solution was prepared, which is aqueous solution containing hydrazine as main component, and not containing alkali hydroxide. Molar ratio of hydrazine contained in reducing agent solution with respect to nickel was 1.51.

[Alkali Hydroxide Solution]

230 g of sodium hydroxide (NaOH, molecular weight: 40.0) as alkali hydroxide was dissolved in 560 mL of pure water, and alkali hydroxide solution was prepared, which is aqueous solution containing sodium hydroxide as main component. Molar ratio of sodium hydroxide contained in alkali hydroxide solution with respect to nickel was 5.75.

[Sulfur-Containing Compound Diluted Solution]

0.79 mg of thioglycolic acid ($HOOCCH_2SH$, molecular weight: 92.12), which is thiol compound having —SH sulfur-containing functional group structure, as sulfur-containing compound was dissolved in 0.1 mL of pure water, and sulfur-containing compound diluted solution was prepared. Molar ratio of thioglycolic acid with respect to nickel (Ni) was 5.0 molar ppm, and it was infinitesimal amount.

[Amine Compound Solution]

2.048 g of ethylene diamine (EDA) ($H_2NC_2H_4NH_2$, molecular weight: 60.1) which is alkylene amine containing two primary amino groups (—$NH_2$) in molecule as amine compound was dissolved in 18 mL of pure water, and amine compound solution was prepared, which is aqueous solution containing ethylene diamine as main component. Molar ratio of ethylene diamine contained in amine compound solution with respect to nickel was 0.02 (2.0 mol %), and it was minute amount.

In addition, as used materials in the nickel salt solution, the reducing agent solution, the alkali hydroxide solution, the sulfur-containing compound diluted solution, and the amine compound solution, reagents made by Wako Pure Chemical Corporation were used, except for 60% hydrazine hydrate.

[Crystallization Step]

Crystallization reaction was performed in crystallization procedure illustrated in FIG. 4 using the above medicaments, and nickel crystal powder was obtained. In other words, after pouring nickel salt solution in which nickel chloride was dissolved in pure water and sulfur-containing compound diluted solution into Teflon coated stainless container with stirring blades, and after heating it to be liquid temperature of 75° C. while stirring, the reducing agent solution containing hydrazine and water in liquid temperature of 25° C. was added and mixed in the stainless container in mixing time of 20 seconds, and nickel salt/reducing agent-containing solution was obtained. The alkali hydroxide solution containing sodium hydroxide and water in liquid temperature of 25° C. was added and mixed to this nickel salt/reducing agent-containing solution in mixing time of 80 seconds, and reaction solution (nickel chloride+hydrazine+sodium hydroxide) in liquid temperature of 63° C. was prepared, and reduction reaction (crystallization reaction) was started (reaction starting temperature: 63° C.). From after 8 minutes after start of reaction until after 18 minutes, the amine compound solution was dripped and mixed into the reaction solution over 10 minutes, and nickel crystal powder was precipitated in reaction solution by progressing reduction reaction while inhibiting autolysis of hydrazine. Within 90 minutes from the start of reaction, reduction reaction was completed, and it was confirmed that supernatant liquid of reaction solution was transparent, and all of nickel components in reaction solution were reduced to metallic nickel.

Reaction solution containing nickel crystal powder was slurry, and slurry containing nickel crystal powder was filtered and washed until conductivity of filtrate filtered from slurry containing nickel crystal powder became 10 μS/cm or less, using pure water with conductivity of 1 μS/cm, and after solid-liquid separation, it was dried in vacuum dryer set to a temperature of 150° C., and nickel crystal powder (nickel powder) was obtained.

[Disintegrating Treatment Step (Post-Treatment Step)]

A disintegrating step was performed after crystallization step, in order to reduce coarse particles formed mainly by coupling of nickel particles in nickel powder. Concretely, spiral jet disintegrating treatment which is dry type disintegrating process was performed to the nickel crystal powder (nickel powder) obtained by crystallization step, and nickel powder relating to example 1 was obtained.

[Nickel Powder]

Average particle size of nickel powder obtained as the above was 0.18 micrometer. In addition, content of chlorine (Cl), sodium (Na), and sulfur (S) in nickel powder was such that chlorine was 0.006 mass %, sodium was 0.0049 mass %, and sulfur was less than 0.01 mass %. These results were illustrated together in Table 1.

Example 2

[Preparation of Nickel Powder]

In the example 1, disulfide compound having sulfur containing functional group —S—S— was prepared instead of thiol compound as sulfur-containing compound. Concretely, as sulfur-containing compound, 1.55 mg of dithioglycolic acid (HOOCCH$_2$SSCH$_2$COOH, molecular weight: 182.22) was dissolved in 0.1 mL of pure water, and sulfur-containing compound diluted solution was prepared. Molar ratio of dithioglycolic acid with respect to nickel was 5.0 molar ppm, and it was infinitesimal amount.

As well as the example 1, after pouring nickel salt solution and this sulfur-containing compound diluted solution into Teflon coated stainless container with stirring blades, and after heating it to be liquid temperature of 75° C. while stirring, the reducing agent solution containing hydrazine and water in liquid temperature of 25° C. was added and mixed in the stainless container in mixing time of 20 seconds, and nickel salt/reducing agent-containing solution was obtained. Further operations were performed as well as the example 1, and nickel powder relating to example 2 was obtained.

[Nickel Powder]

Average particle size of nickel powder obtained as the above was 0.10 micrometer. In addition, content of chlorine, sodium, and sulfur in nickel powder was such that chlorine was 0.003 mass %, sodium was 0.0031 mass %, and sulfur was less than 0.01 mass %. These results were illustrated together in Table 1.

Example 3

[Preparation of Nickel Powder]

In the example 1, metal salt of metal more noble than nickel was dissolved in nickel salt solution in addition to nickel chloride hexahydrate, and thiosulfate was prepared instead of thiol compound as sulfur-containing compound.

Concretely, 405 g of nickel chloride hexahydrate (NiCl$_2$.6H$_2$O, molecular weight: 237.69) as nickel salt and 1.6 mg of palladium (II) chloride ammonium (tetrachloropalladium (II) ammonium dihydrate) ((NH$_4$)$_2$PdCl$_4$, molecular weight: 284.31) as metal salt of metal more noble than nickel were dissolved in 1880 mL of pure water, and nickel salt solution was prepared. Here, in nickel salt solution, palladium (Pd) was 6.0 mass ppm (3.3 molar ppm) with respect to nickel (Ni).

In addition, as sulfur-containing compound diluted solution, 1.35 mg of sodium thiosulfate (Na$_2$S$_2$O$_3$, molecular weight: 158.11) which is thiosulfate was dissolved in 0.1 mL of pure water, and disulfide diluted solution was prepared. Molar ratio of sodium thiosulfate with respect to nickel was 5.0 molar ppm, and it was infinitesimal amount.

As well as the example 1, after pouring these nickel salt solution and sulfur-containing compound diluted solution into Teflon coated stainless container with stirring blades, and after heating it to be liquid temperature of 75° C. while stirring, the reducing agent solution containing hydrazine and water in liquid temperature of 25° C. was added and mixed in the stainless container in mixing time of 20 seconds, and nickel salt/reducing agent-containing solution was obtained. The alkali hydroxide solution containing sodium hydroxide and water in liquid temperature of 25° C. was added and mixed to this nickel salt/reducing agent-containing solution in mixing time of 80 seconds, and reaction solution in liquid temperature of 63° C. was prepared, and reduction reaction (crystallization reaction) was started (reaction starting temperature: 63° C.). At this time, the reaction solution contains nickel chloride, palladium salt, hydrazine, sodium hydroxide, and sulfur-containing compound. Further operations were performed as well as the example 1, and nickel powder relating to example 3 was obtained.

[Nickel Powder]

Average particle size of nickel powder obtained as the above was 0.08 micrometer. In addition, content of chlorine, sodium, and sulfur in nickel powder was such that chlorine was 0.004 mass %, sodium was 0.0035 mass %, and sulfur was less than 0.01 mass %. These results were illustrated together in Table 1.

Example 4

[Preparation of Nickel Powder]

In the example 1, metal salt of metal more noble than nickel was dissolved in nickel salt solution in addition to nickel chloride hexahydrate, and nickel salt solution was prepared.

Concretely, 405 g of nickel chloride hexahydrate ($NiCl_2 \cdot 6H_2O$, molecular weight: 237.69) as nickel salt and 26.7 mg of palladium (II) chloride ammonium (tetrachloropalladium (II) ammonium dihydrate) (($NH_4)_2PdCl_4$, molecular weight: 284.31) as metal salt of metal more noble than nickel were dissolved in 1880 mL of pure water, and nickel salt solution was prepared. Here, in nickel salt solution, palladium (Pd) was 100.0 mass ppm (55 molar ppm) with respect to nickel (Ni).

In addition, as sulfur-containing compound diluted solution, 7.1 mg of thioglycolic acid ($HOOCCH_2SH$, molecular weight: 92.12), which is thiol compound, was dissolved in 1 mL of pure water, and sulfur-containing compound diluted solution was prepared. Molar ratio of thioglycolic acid with respect to nickel (Ni) was 45.0 molar ppm, and it was infinitesimal amount.

[Nickel Powder]

Average particle size of nickel powder obtained as the above was 0.06 micrometer. In addition, content of chlorine, sodium, and sulfur in nickel powder was such that chlorine was 0.008 mass %, sodium was 0.0026 mass %, and sulfur was less than 0.01 mass %. These results were illustrated together in Table 1.

Example 5

[Preparation of Nickel Powder]

In the example 4, amount of thioglycolic acid in sulfur-containing compound diluted solution was changed, and nickel powder was prepared. Concretely, 0.0158 mg of thioglycolic acid ($HOOCCH_2SH$, molecular weight: 92.12) was dissolved in 0.1 mL of pure water, and sulfur-containing compound diluted solution was prepared. Molar ratio of thioglycolic acid with respect to nickel (Ni) was 0.1 molar ppm, and it was infinitesimal amount.

[Nickel Powder]

Average particle size of nickel powder obtained as the above was 0.16 micrometer. In addition, content of chlorine, sodium, and sulfur in nickel powder was such that chlorine was less than 0.001 mass %, sodium was 0.0024 mass %, and sulfur was less than 0.01 mass %. These results were illustrated together in Table 1.

Comparative Example 1

[Preparation of Nickel Powder]

In the example 1, nickel powder was prepared in similar conditions except that sulfur-containing compound diluted solution was not prepared, and thioglycolic acid was not added to reaction solution in crystallization step.

[Nickel Powder]

Average particle size of nickel powder obtained as the above was 0.89 micrometer. In addition, content of chlorine, sodium, and sulfur in nickel powder was such that chlorine was less than 0.004 mass %, sodium was 0.0037 mass %, and sulfur was less than 0.01 mass %. These results were illustrated together in Table 1.

Comparative Example 2

[Preparation of Nickel Powder]

In the example 3, nickel powder was prepared in similar conditions except that sulfur-containing compound diluted solution was not prepared, and sodium thiosulfate was not added to reaction solution in crystallization step.

[Nickel Powder]

Average particle size of nickel powder obtained as the above was 0.26 micrometer. In addition, content of chlorine, sodium, and sulfur in nickel powder was such that chlorine was less than 0.003 mass %, sodium was 0.0016 mass %, and sulfur was less than 0.01 mass %. These results were illustrated together in Table 1.

Comparative Example 3

[Preparation of Nickel Powder]

In the example 4, amount of thioglycolic acid in sulfur-containing compound diluted solution was changed, and nickel powder was prepared. Concretely, 13.4 mg of thioglycolic acid ($HOOCCH_2SH$, molecular weight: 92.12) was dissolved in 1 mL of pure water, and sulfur-containing compound diluted solution was prepared. Molar ratio of thioglycolic acid with respect to nickel (Ni) was 85.0 molar ppm. However, reduction reaction did not progress in reaction solution, and it was not possible to obtain nickel powder. This result is illustrated in Table 1.

TABLE 1

| | Sulfur-containing compound | | | Metal salt of metal more noble than nickel | | | | Ni powder | | | |
|---|---|---|---|---|---|---|---|---|---|---|---|
| | Substance name | Blending quantity: A (molar ppm with respect to Ni) | Effective multiplication factor: B | Type | Blending quantity: C (molar ppm with respect to Ni) | A × B | 0.75 C + 30 | Average particle size (μm) | Cl content (mass %) | Na content (mass %) | S content (mass %) |
| Example 1 | Thioglycolic acid | 5.0 | 1 | None | 0 | 5.0 | 30 | 0.18 | 0.006 | 0.0049 | <0.01 |
| Example 2 | Dithioglycolic acid | 5.0 | 2 | None | 0 | 10.0 | 30 | 0.10 | 0.003 | 0.0031 | <0.01 |
| Example 3 | Sodium thiosulfate | 5.0 | 1 | Pd | 3.3 | 5.0 | 32.5 | 0.08 | 0.004 | 0.0035 | <0.01 |
| Example 4 | Thioglycolic acid | 45.0 | 1 | Pd | 55 | 45.0 | 71.3 | 0.06 | 0.008 | 0.0026 | <0.01 |
| Example 5 | Thioglycolic acid | 0.1 | 1 | Pd | 55 | 0.1 | 71.3 | 0.16 | <0.001 | 0.0024 | <0.01 |
| Comparative example 1 | None | 0 | — | None | — | 0 | 30 | 0.89 | 0.004 | 0.0037 | <0.01 |
| Comparative example 2 | None | 0 | — | Pd | 3.3 | 0 | 32.5 | 0.26 | 0.003 | 0.0016 | <0.01 |
| Comparative example 3 | Thioglycolic acid | 85.0 | 1 | Pd | 55 | 85.0 | 71.3 | Nickel powder cannot be obtained. | | | |

Examples 1 and 2, in which blending quantity (A) of thioglycolic acid and dithioglycolic acid (ratio of substance quantity of sulfur-containing compound with respect to nickel) in reaction solution were both 5.0 molar ppm, and in which palladium salt (metal salt of metal more noble than nickel) was not added, were satisfying a formula 1 (0.1≤A*B≤0.75C+30 (0≤C≤100)) (refer to FIG. 2) when ratio of substance quantity of sulfur-containing compound and nickel was (A) [molar ppm], effective multiplication factor of sulfur-containing functional group was (B) [magnification], and ratio of substance quantity of metal salt of metal more noble than nickel and nickel was (C) [molar ppm], and by comparing with comparative example 1 which was not satisfying the formula 1 (refer to FIG. 2) as both sulfur-containing compound and metal salt of metal more noble than nickel were not added, content of chlorine and sodium in nickel powder were both maintained to be 0.01 mass % or less and average particle size became significantly small, and it can be understood that fine nickel powder was obtained.

Similarly, in example 3 (refer to FIG. 2) satisfying the formula 1, and in which blending quantity (A) of sodium thiosulfate (ratio of substance quantity of sulfur-containing compound with respect to nickel) in reaction solution was 5.0 molar ppm, while blending quantity (C) of palladium (ratio of substance quantity of metal salt of metal more noble than nickel with respect to nickel) in reaction solution was 3.3 molar ppm, by comparing with comparative example 2 (refer to FIG. 2) not satisfying formula 1 as sulfur-containing compound was not added, content of chlorine and sodium in nickel powder were both maintained to be 0.01 mass % or less and average particle size became significantly small, and it can be understood that fine nickel powder was obtained.

When comparing example 4, example 5, and comparative example 3, in which blending quantity (C) of palladium (ratio of substance quantity of metal salt of metal more noble than nickel with respect to nickel) in reaction solution was 55 molar ppm, and also, in which thioglycolic acid was added as sulfur-containing compound, in examples 4 and 5 (refer to FIG. 2) satisfying the formula 1 as blending quantity (A) of thioglycolic acid (ratio of substance quantity of sulfur-containing compound with respect to nickel) was 0.1 molar ppm (example 5) and 45.0 molar ppm (example 4), content of chlorine and sodium in nickel powder were both maintained to be 0.01 mass % or less and average particle size became small, and it can be understood that fine nickel powder was obtained. On the other hand, in comparative example 3 (refer to FIG. 2) not satisfying the formula 1 (A>0.75B+30) as blending quantity (A) of thioglycolic acid was 85.0 molar ppm, reduction reaction did not progress in reaction solution, and it can be understood that it was not possible to obtain nickel powder.

In addition, in the examples 1 to 5, blending quantity (A) of sulfur-containing compound (ratio of substance quantity of sulfur-containing compound with respect to nickel) was 45.0 molar ppm at maximum, and it was infinitesimal amount, so it can be understood that amount of sulfur contained in nickel powder was maintained to be less than 0.01 mass %.

In addition, when blending quantity (C) of palladium (ratio of substance quantity of metal salt of metal more noble than nickel with respect to nickel) in reaction solution was respectively 10 ppm, 20 ppm, 40 ppm, 80 ppm, and 100 ppm, various tests were performed by changing blending quantity (A) of thioglycolic acid as sulfur-containing compound (ratio of substance quantity of sulfur-containing compound with respect to nickel), and when the formula 1 was not satisfied (A*B>0.75C+30), reduction reaction was significantly delayed or stopped in reaction solution, on the other hand, when the formula 1 was satisfied (0.1≤A*B≤0.75C+30), average particle size could be small as 0.2 micrometer or less, while maintaining content of each of chlorine, sodium and sulfur in nickel powder to be 0.01 mass % or less, and it was confirmed that fine nickel powder can be obtained.

The invention claimed is:

1. A process for producing nickel powder, comprising a crystallization step for obtaining nickel crystal powder by reduction reaction in reaction solution in which water-soluble nickel salt, reducing agent, alkali hydroxide, optionally, metal salt of metal more noble than nickel, and water are mixed, and which is blended with sulfur-containing compound in advance, wherein the reducing agent is hydrazine ($N_2H_4$), the sulfur-containing compound is a compound having any of sulfur-containing functional group structure represented by —SH, sulfur-containing functional group structure represented by —S—S—, sulfur-containing functional group structure represented by —O—S(=S)(=O)—O— in molecule, and it satisfies following formula 1, when a ratio of substance quantity of the sulfur-containing compound and nickel in the reaction solution ((molar number of the sulfur-containing compound/molar number of nickel)*$10^6$) is A [molar ppm], when an effective multiplication factor of the sulfur-containing functional group of the sulfur-containing compound is B [magnification] (—SH: 1, —S—S—: 2, —O—S(=S)(=O)—O—: 1), and when a ratio of substance quantity of the metal salt of metal more noble than nickel and nickel ((molar number of metal salt of metal more noble than nickel/molar number of nickel)*$10^6$) is C [molar ppm], $$0.1 \leq A*B \leq 0.75C+20 \ (0 \leq C \leq 100) \quad \text{(Formula 2)}.$$

2. The process for producing nickel powder according to claim 1, wherein the metal salt of metal more noble than nickel is palladium salt.

3. The process for producing nickel powder according to claim 1, wherein the sulfur-containing compound is one or more selected from thioglycolic acid ($HOOCCH_2SH$), thiomalic acid ($HOOCCH(SH)CH_2COOH$), and sodium hydrogen sulfide (NaSH).

4. The process for producing nickel powder according to claim 1, wherein the sulfur-containing compound is one or more selected from dithioglycolic acid ($HOOCCH_2SSCH_2COOH$) and dimethyl disulfide ($CH_3SSCH_3$).

5. The process for producing nickel powder according to claim 1, wherein the sulfur-containing compound is one or more selected from thiosulfuric acid ($H_2S_2O_3$), sodium thiosulfate ($Na_2S_2O_3$), and potassium thiosulfate ($K_2S_2O_3$).

6. The process for producing nickel powder according to claim 1, wherein average particle size of nickel powder is 0.02 micrometer to 0.2 micrometer.

7. The process for producing nickel powder according to claim 1, wherein the water-soluble nickel salt is one or more selected from nickel chloride ($NiCl_2$), nickel sulfate ($NiSO_4$), and nickel nitrate ($Ni(NO_3)_2$).

8. The process for producing nickel powder according to claim 1, wherein the alkali hydroxide is one or more selected from sodium hydroxide (NaOH) and potassium hydroxide (KOH).

9. The process for producing nickel powder according to claim 1, wherein it contains amine compound in the reaction solution, the amine compound contains two or more of any of functional group selected from primary amino group ($-NH_2$) or secondary amino group ($-NH-$) in molecule, and
a ratio of substance quantity of the amine compound and nickel in the reaction solution (molar number of the amine compound/molar number of nickel*100) is in a range of 0.01 mol % to 5 mol %.

10. The process for producing nickel powder according to claim 9, wherein the amine compound is any of alkylene amine or alkylene amine derivative.

11. The process for producing nickel powder according to claim 10, wherein the alkylene amine is one or more selected from ethylene diamine ($H_2NC_2H_4NH_2$), diethylene triamine ($H_2NC_2H_4NHC_2H_4NH_2$), triethylene tetramine ($H_2N(C_2H_4NH)_2C_2H_4NH_2$), tetraethylene pentamine ($H_2N(C_2H_4NH)_3C_2H_4NH_2$), pentaethylene hexamine ($H_2N(C_2H_4NH)_4C_2H_4NH_2$), and the alkylene amine derivative is one or more selected from tris (2-aminoethyl) amine ($N(C_2H_4NH_2)_3$), (2-aminoethyl) aminoethanol ($H_2NC_2H_4NHC_2H_4OH$), ethylene diamine-N, N'-diacetate ($HOOCCH_2NHC_2H_4NHCH_2COOH$).

12. The process for producing nickel powder according to claim 1, wherein in the crystallization step, reaction starting temperature of the reaction solution is 40° C. to 90° C.

13. The process for producing nickel powder according to claim 1, wherein C>0 in Formula 2.

* * * * *